United States Patent
Fayyad et al.

(10) Patent No.: US 7,680,571 B2
(45) Date of Patent: Mar. 16, 2010

(54) VEHICLE DIFFERENTIAL SCORE PROTECTION

(75) Inventors: Haytham A. Fayyad, Dexter, MI (US); Min K. Kim, Troy, MI (US)

(73) Assignee: GM global Technology Operations, Inc., Detroit, MI (US)

( * ) Notice: Subject to any disclaimer, the term of this patent is extended or adjusted under 35 U.S.C. 154(b) by 735 days.

(21) Appl. No.: 11/530,623

(22) Filed: Sep. 11, 2006

(65) Prior Publication Data

US 2008/0076630 A1    Mar. 27, 2008

(51) Int. Cl.
*G60W 10/04* (2006.01)
*G06F 19/00* (2006.01)

(52) U.S. Cl. .............................. 701/29; 701/84; 701/88; 477/35

(58) Field of Classification Search ................... 701/29, 701/51, 75, 84, 88–91, 101; 477/5, 35
See application file for complete search history.

(56) References Cited

U.S. PATENT DOCUMENTS

| | | | |
|---|---|---|---|
| 5,548,513 A * | 8/1996 | Masuda et al. ................ | 701/90 |
| 5,978,726 A * | 11/1999 | Takeda et al. ................ | 701/84 |
| 6,336,069 B1 * | 1/2002 | Hasegawa et al. ............ | 701/69 |
| 6,701,241 B2 * | 3/2004 | Senger et al. ................ | 701/67 |
| 7,356,401 B2 * | 4/2008 | Romer et al. ................ | 701/84 |
| 2006/0161325 A1 * | 7/2006 | Jiang ........................... | 701/54 |

* cited by examiner

*Primary Examiner*—Tan Q Nguyen

(57) ABSTRACT

A differential score protection system that regulates an engine to inhibit damage to a differential driven by the engine includes a first module that initiates a differential score protection mode and a second module that decreases an engine speed when the engine speed exceeds an engine speed limit. The engine speed limit is one of a plurality of pre-determined values based on a design slip speed limit of the differential.

18 Claims, 5 Drawing Sheets

VEHICLE DIFFERENTIAL SCORE PROTECTION

FIELD

The present disclosure relates to vehicle differentials, and more particularly to a vehicle differential score protection control.

BACKGROUND

The statements in this section merely provide background information related to the present disclosure and may not constitute prior art.

A vehicle includes a power plant, such as an internal combustion engine that drives a transmission and a driveline to propel the vehicle along a surface. More specifically, the power plant generates drive torque that is multiplied by a gear ratio through the transmission. The drive torque drives a differential that directs the drive torque to driven wheels, that provides a final gear reduction, and that transmits drive torque to the wheels while allowing them to rotate relative to one another (i.e., at different speeds).

Although the differential enables the driven wheels to rotate at different speeds, the differential can be damaged or scored with an excessive difference in wheel speed or ΔRPM across the differential. A ΔRPM across the differential can occur when the driven wheels are on surfaces having different frictional coefficients. For example, if one wheel is on a low frictional surface (e.g., ice) and the other is on a higher frictional surface (e.g., dry pavement), the wheel on the lower frictional surface can rotate at a higher speed than that on the higher frictional surface.

If the differential is damaged as a result of experiencing an excessive ΔRPM for an extended period, the differential must be replaced. In some instances (e.g., front wheel drive vehicles), the differential is integrated into the transmission. As a result, the cost to replace the differential is compounded by the additional work required to access the differential within the transmission.

Accordingly, vehicles implement a differential score protection (DSP) control to prevent damage to the differential. Traditional DSP control regulates engine torque output when wheel slip occurs. More specifically, the traditional DSP control decreases engine torque to reduce engine output power, allowing the wheels to grip their respective surfaces and to resolve the wheel slip condition.

The amount of engine torque reduction is calibrated based on various ΔRPM values. This calibration, however, is time and cost intensive. More specifically, a calibration engineer must develop the calibrations to resolve the wheel slip condition, while providing sufficient drivability or feel for the vehicle operator. For example, the vehicle operator should not perceive excessive power sags or surges while the DSP control is active. Also, when the DSP control goes inactive, a calibration is provided to ramp the engine torque out of the DSP mode.

The DSP control is executed by a control module, which can be supplied by multiple manufacturers for a single vehicle platform. As a result, the calibration process is compounded because the calibration parameters developed for a particular vehicle must be translated for the various control module types. For example, if the calibration parameters require an engine torque decrease of X Nm for a ΔRPM of Y, the control modules interpret the X Nm value differently and therefore must be correspondingly calibrated to provide the proper engine torque reduction response based on the particular control module that is used.

SUMMARY

Accordingly, the present invention provides a differential score protection system that regulates an engine to inhibit damage to a differential driven by the engine. The differential score protection system includes a first module that initiates a differential score protection mode and a second module that decreases an engine speed when the engine speed exceeds an engine speed limit. The engine speed limit is one of a plurality of pre-determined values based on a design slip speed limit of the differential.

In one feature, the engine speed limit is further determined based on a transmission gear ratio.

In another feature, the decreasing includes decreasing at a fixed engine speed reduction rate.

In another feature, the differential score protection system further includes sensors that monitor respective wheel speeds of first and second wheels, and a third module that determines a wheel slip differential based on the wheel speeds. The initiating is executed when the wheel slip differential exceeds a threshold wheel slip differential.

In still another feature, the first and second wheels are driven by the differential.

In yet another feature, the differential score protection system further includes a sensor that monitors a rotational speed of a transmission output shaft, and a third module that compares the rotational speed to an expected output shaft rotational speed. The initiating is executed when the rotational speed exceeds the expected rotational speed by a threshold amount.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
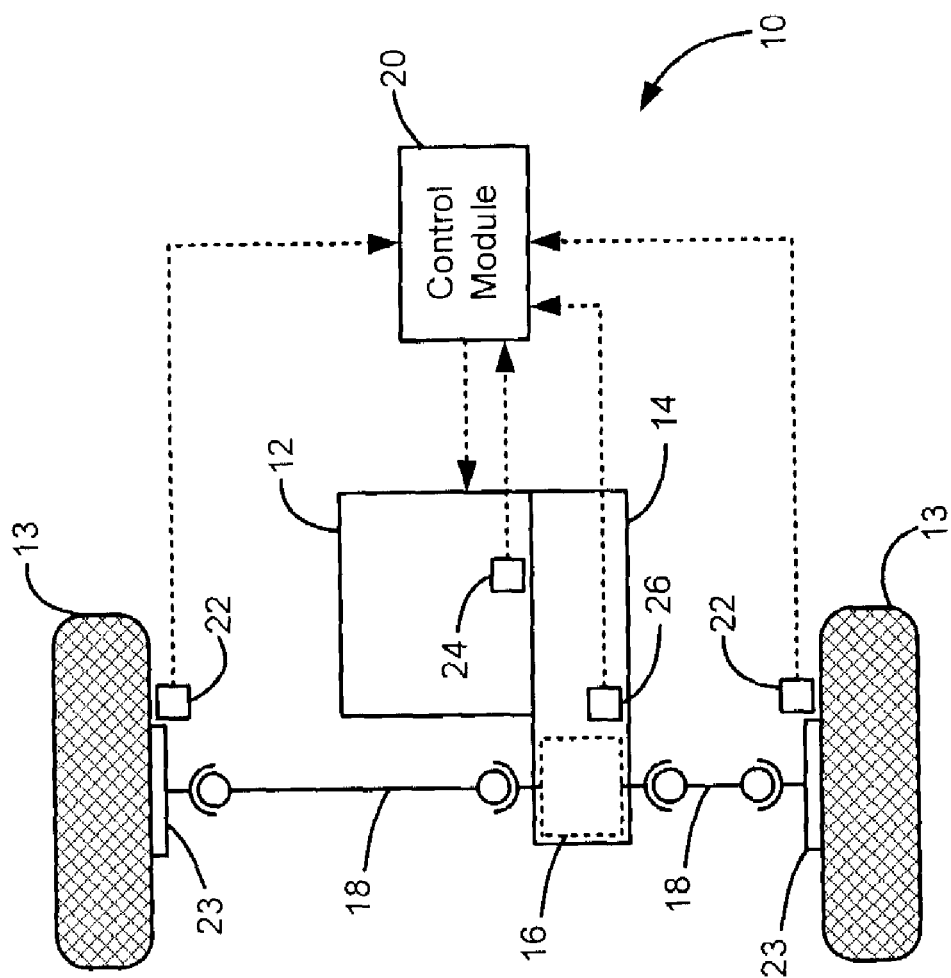
FIG. 1 is a functional block diagram of an exemplary vehicle system that implements a vehicle differential score protection control in accordance with the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle system 10 includes an engine 12 that generates drive torque to drive driven wheels 13. More specifically, the drive torque is transferred to the driven wheels 13 through a transmission 14, a differential 16 and drive shafts 18. The transmission 14 is driven by the engine 12 through a coupling device (e.g., a torque converter or clutch) (not shown), and multiplies the drive torque by one of a plurality of selectable gear ratios. The differential 16 is driven by an output shaft (not shown) of the transmission 14, whereby the drive torque is multiplied by a final drive ratio. The differential 16 splits the drive torque between the drive shafts 18, and enables the driven wheels 13 to be driven at different speeds, for example, when the vehicle is following a curved path.

Although the exemplary vehicle system 10 is illustrative of a front wheel drive vehicle, it is anticipated that the DSP control of the present invention can be implemented in rear wheel drive vehicles, four wheel and even all wheel drive vehicles. For example, it is anticipated that the DSP control can be implemented to protect a front differential that drives wheels associated with a front axle, such as the differential 16 and the driven wheels 13, as well as a rear differential that drives wheels associated with a rear axle.

A control module 20 implements the DSP control of the present invention to regulate operation of the vehicle system 10 based on vehicle operating parameters. The vehicle can have an ABS system that includes ABS sensors 22 that respectively monitor the rotation of toothed wheels 23 that rotate at the same speed as the driven wheels. It is also anticipated that ABS sensors and toothed wheels can be associated with the non-driven wheels (not shown). An engine speed sensor 24 monitors an engine speed ($RPM_{ENG}$) and a transmission output shaft speed (TOSS) sensor 26 monitors the rotational speed of the transmission output shaft.

The DSP control of the present invention limits $RPM_{ENG}$ based on an RPM limit ($RPM_{LIM}$). More specifically, the DSP control first determines whether to enter a DSP mode based on an actual or probable wheel slip condition. More specifically, the DSP control monitors the respective rotational speeds ($RPM_1$, $RPM_2$) of the driven wheels associated with the differential based on the signals generated by the respective ABS sensors. In the event that the ABS sensors associated with the driven wheels are not functioning properly, the DSP control monitors the respective rotational speeds of the non-driven wheels, whereby $RPM_1$ and $RPM_2$ correspond to the wheel speeds of the non-driven wheels. Wheel slip across the non-driven wheels indicates potential wheel slip across the driven wheels, and thus the differential.

In the event that none of the ABS sensors are functioning properly, or in the event that the vehicle is not equipped with an ABS system, and therefore does not include ABS sensors, the DSP control monitors a rotational speed of a transmission output shaft. More specifically, the rotational speed of the output shaft is provided as $RPM_1$ and an expected output shaft speed is provided as $RPM_2$. A transmission output shaft rotational speed that is higher than expected indicates potential wheel slip across the driven wheels, and thus the differential. $RPM_2$ is determined based on vehicle operating parameters including, but not limited to, engine RPM and the transmission gear ratio.

The DSP control determines an RPM differential ($\Delta RPM$) as the difference between $RPM_1$ and $RPM_2$. In the cases where $RPM_1$ and $RPM_2$ are associated with either the driven wheels or non-driven wheels, $\Delta RPM$ is calculated as the difference therebetween. In the case where $RPM_1$ is the transmission output shaft speed and $RPM_2$ is the expected output shaft speed, $\Delta RPM$ is calculated as the difference therebetween.

If $\Delta RPM$ is greater than a differential threshold ($\Delta RPM_{THR}$), it is assumed that there is an unacceptable speed difference across the differential and a DSP control flag ($FLAG_{DSP}$) is set equal to 1, indicating initiation of a DSP mode. When operating in the DSP mode, the DSP control of the present invention regulates engine operation based on $RPM_{ENG}$ and $RPM_{LIM}$. $RPM_{LIM}$ is selected from a plurality of predetermined values that are stored in memory and that are determined based on a differential speed design limit provided by the differential manufacturer and the transmission gear ratios. More specifically, $RPM_{LIM}$ is back calculated for each transmission gear ratio and the corresponding values of $RPM_{LIM}$ are stored in memory. Because $RPM_{LIM}$ is directly calculated based on the design limit and the transmission gear ratios, the traditional calibration procedure is no longer required. In this manner, the vehicle development time and costs are significantly reduced. Further, the $RPM_{LIM}$ values remain constant, regardless of which manufacturer's control is implemented in a particular vehicle.

If $RPM_{ENG}$ is greater than $RPM_{LIM}$, the DSP control sets an RPM flag ($FLAG_{RPM}$) equal to 1, indicating that $RPM_{ENG}$ is to be reduced to below $RPM_{LIM}$ in a controlled manner. For example, the rate of decrease of $RPM_{ENG}$ is set so that the vehicle operator does not perceive an engine sag. If $RPM_{ENG}$ is below $RPM_{LIM}$, $RPM_{ENG}$ is increased or decreased based on the normal engine control routine. For example, $RPM_{ENG}$ can be regulated based on an input (Input) including, but not limited to, an accelerator pedal position.

Figure 2:
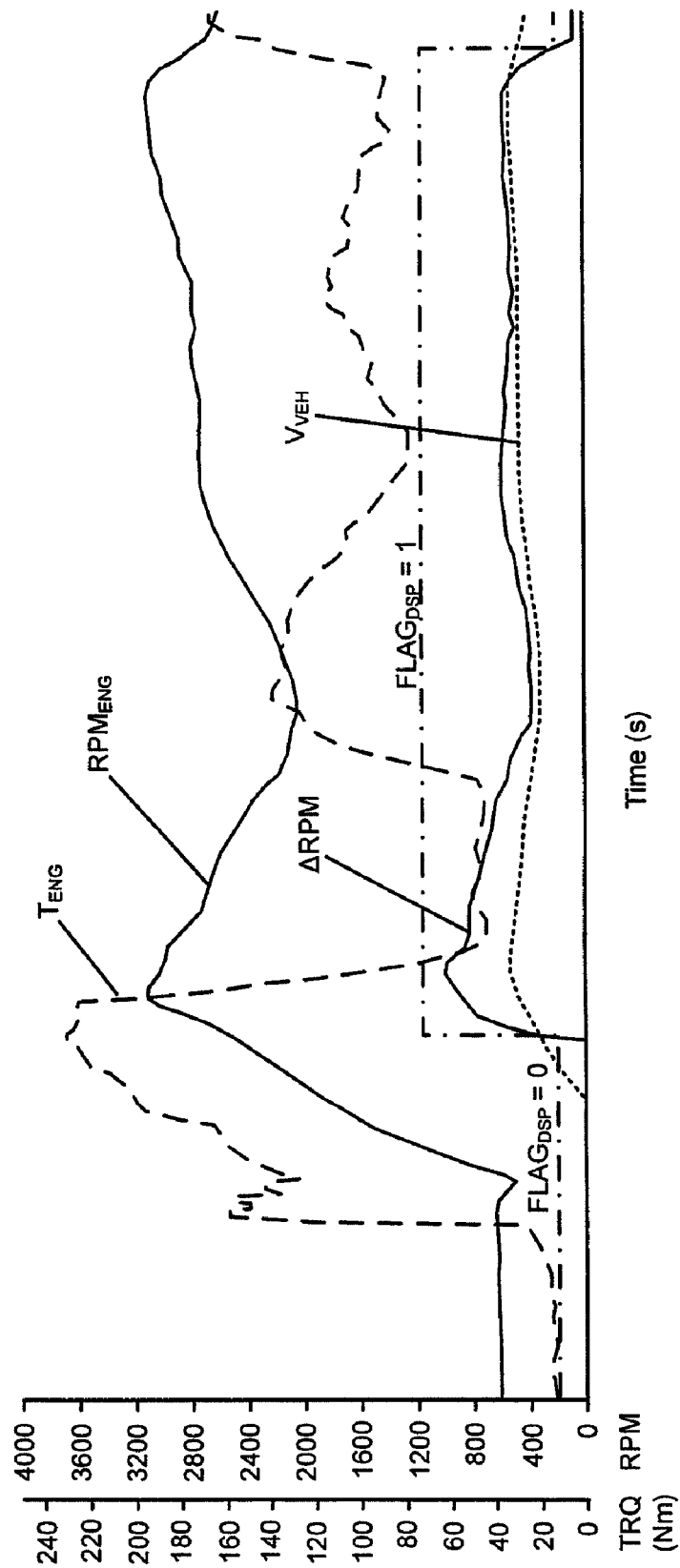
FIG. 2 is a graph illustrating traces of exemplary vehicle operating parameters using a traditional differential protection control.
Figure 3:
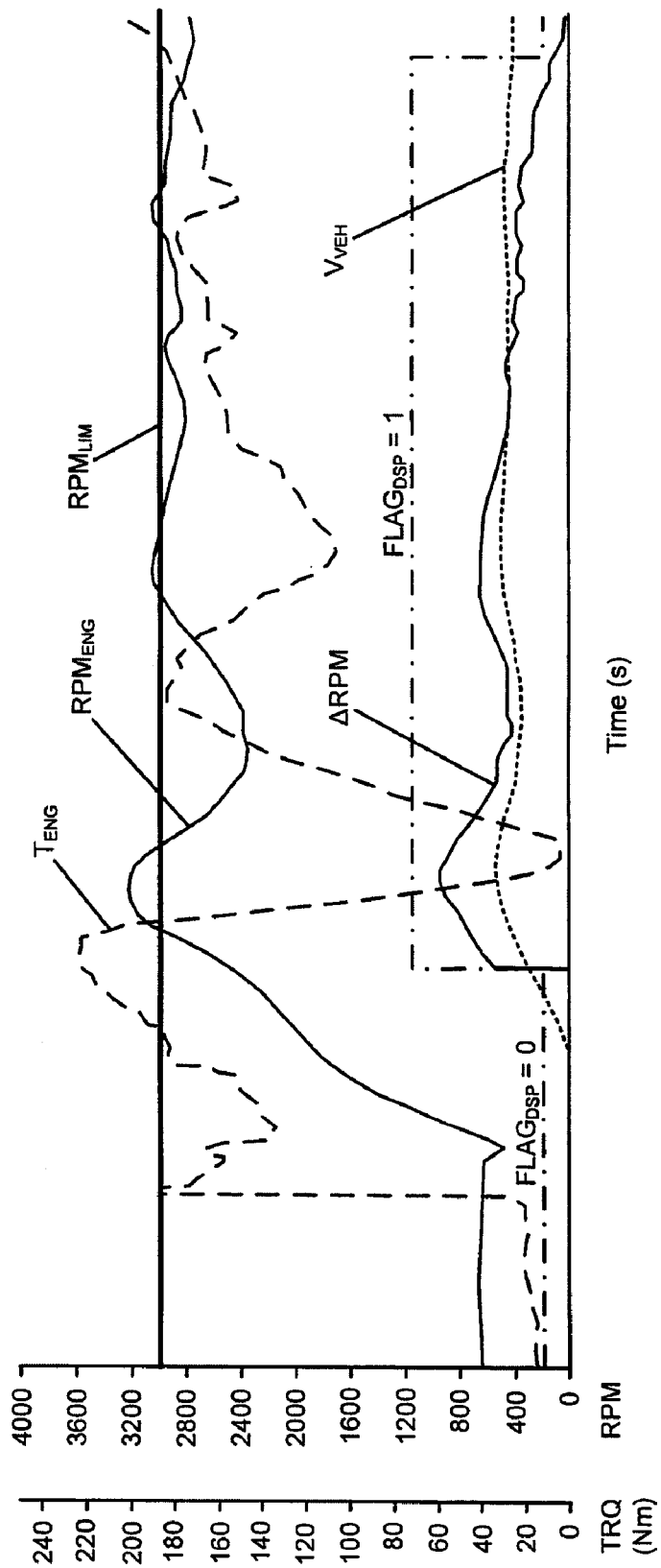
FIG. 3 is a graph illustrating traces of exemplary vehicle operating parameters using the vehicle differential protection control of the present invention.

Referring now to FIGS. 2 and 3, exemplary traces of engine operating parameters are shown using a traditional DSP control and the vehicle differential protection control of the present invention, respectively. As seen in FIG. 2, the traditional torque-based DSP control includes a significant engine speed fluctuation while the DSP control is active, which results in a surging/sagging feel to the vehicle operator. As seen in FIG. 3, the engine speed-based DSP control of the present invention balances $RPM_{ENG}$ near $RPM_{LIM}$, while tracking $V_{VEH}$.

Figure 4:
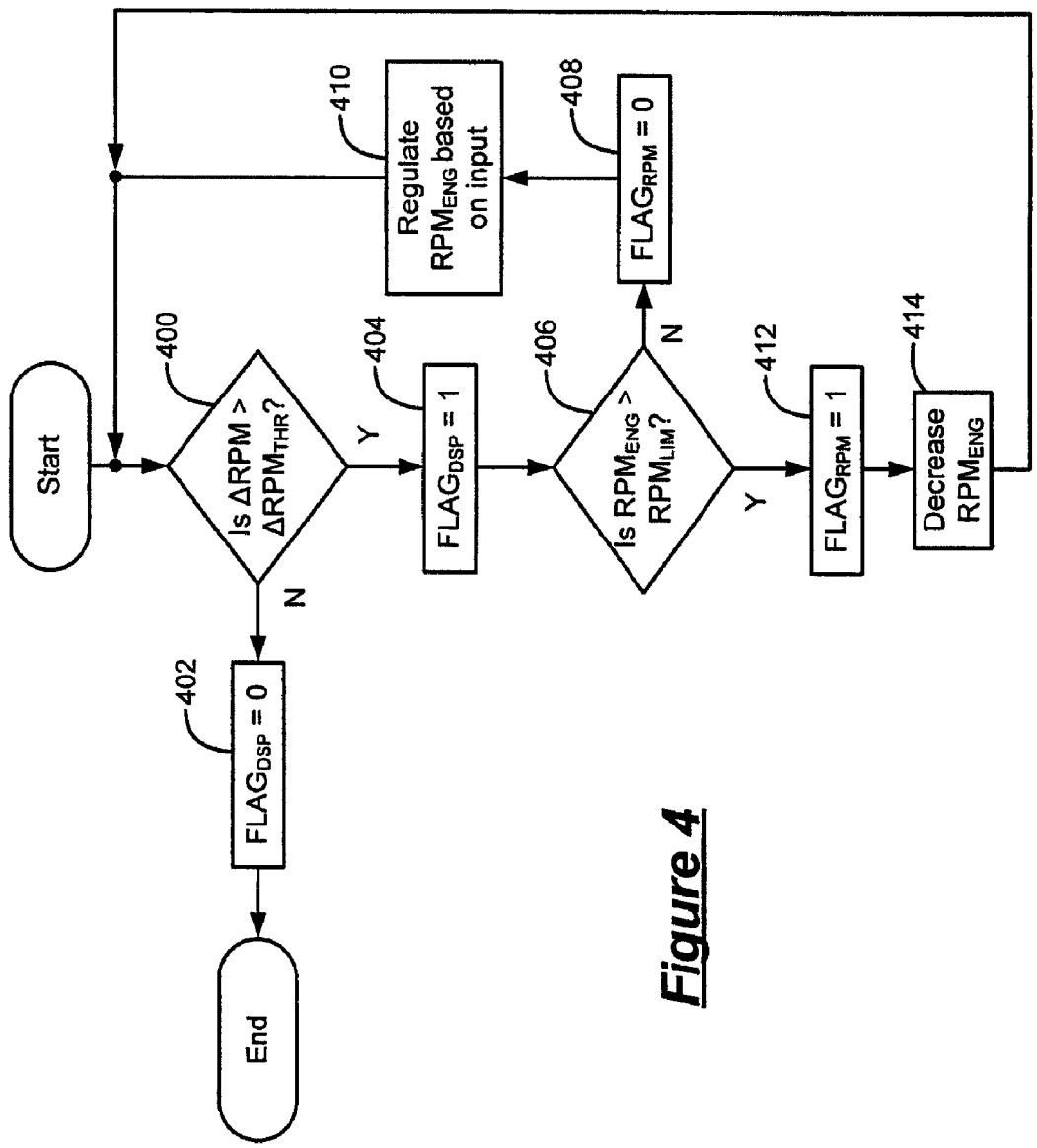
FIG. 4 is a flowchart illustrating exemplary steps executed by the vehicle differential protection control of the present invention.

Referring now to FIG. 4, exemplary steps executed by the virtual accelerometer control of the present invention will be described in detail. In step 400 control determines whether to initiate the DSP mode. For example, if $\Delta RPM$ is greater than $\Delta RPM_{THR}$, control initiates the DSP mode. If the DSP mode is not initiated, control sets $FLAG_{DSP}$ equal to 0 and control ends. If the DSP mode is initiated, control sets $FLAG_{DSP}$ equal to 1 in step 404.

In step 406, control determines whether $RPM_{ENG}$ is greater than $RPM_{LIM}$. If $RPM_{ENG}$ is not greater than $RPM_{LIM}$, control sets $FLAG_{RPM}$ equal to 0 in step 408. In step 410, control regulates engine operation based on an input signal (e.g., accelerator pedal position, cruise control) and loops back to step 400. If $RPM_{ENG}$ is greater than $RPM_{LIM}$, control sets $FLAG_{RPM}$ equal to 1 in step 412. In step 414, control decreases $RPM_{ENG}$ and loops back to step 400.

Figure 5:
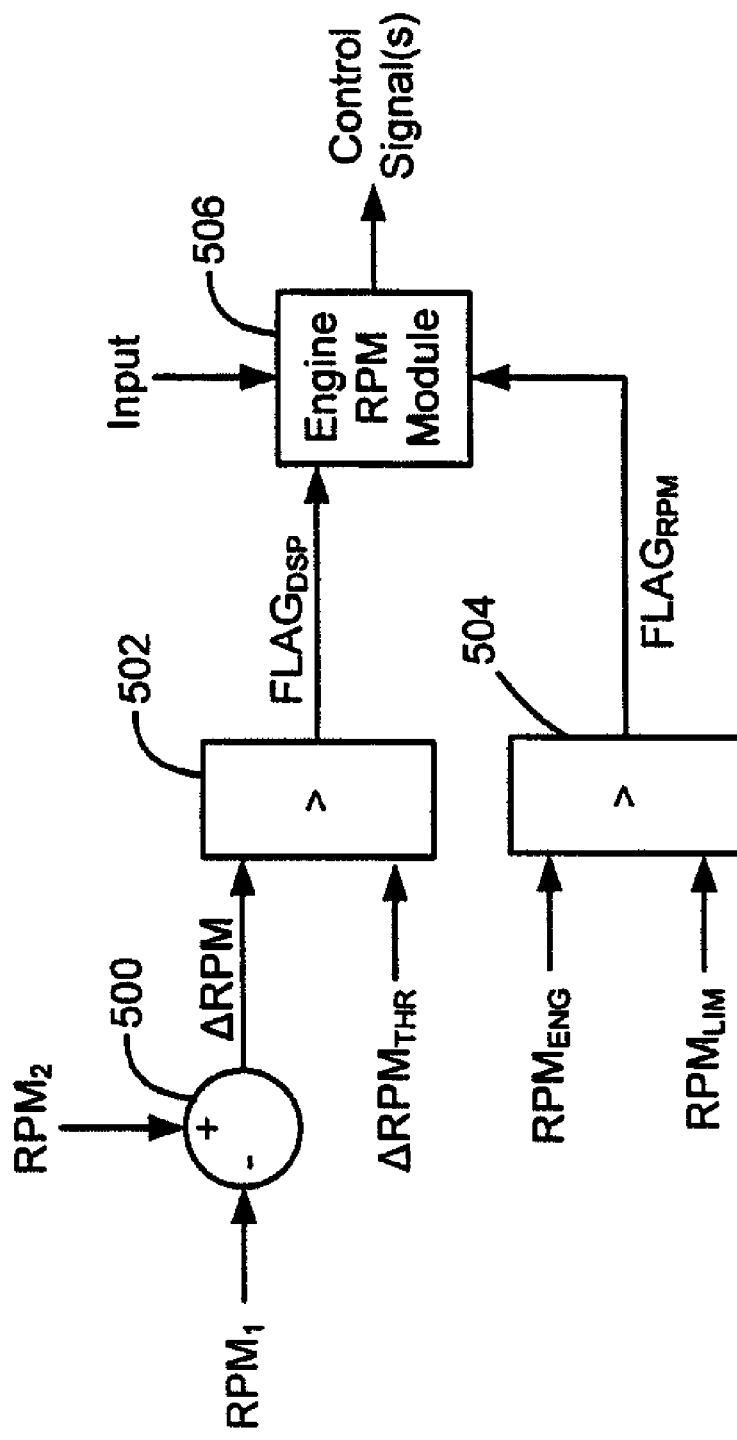
FIG. 5 is a functional block diagram of exemplary modules that execute the virtual accelerometer control of the present invention.

Referring now to FIG. 5, exemplary modules that execute the virtual accelerometer control of the present invention will be described in detail. The exemplary modules include a summer module 500, a first comparator module 502, a second comparator module 504 and an engine RPM module 506. The summer module 500 calculates $\Delta RPM$ as a difference between $RPM_{W1}$ and $RPM_{W2}$. The first comparator module 502 compares $\Delta RPM$ to $\Delta RPM_{THR}$ and sets $FLAG_{DSP}$ based thereon. More specifically, the first comparator module 502 sets $FLAG_{DSP}$ equal to 0 if $\Delta RPM$ is not greater than $\Delta RPM_{THR}$ and sets $FLAG_{DSP}$ equal to 1 if $\Delta RPM$ is greater than $\Delta RPM_{THR}$.

The second comparator module 504 compares $RPM_{ENG}$ to $RPM_{LIM}$ and sets $FLAG_{RPM}$ based thereon. More specifically, the second comparator module 504 sets $FLAG_{RPM}$ equal to 0 if $RPM_{ENG}$ is not greater than $RPM_{LIM}$ and sets $FLAG_{RPM}$ equal to 1 if $RPM_{ENG}$ is greater than $RPM_{LIM}$. The engine RPM module 506 regulates the engine speed based on $FLAG_{DSP}$, $FLAG_{RPM}$ and Input. More specifically, if both $FLAG_{DSP}$ and $FLAG_{RPM}$ are set equal to 1, the engine RPM module 506 decreases $RPM_{ENG}$. If $FLAG_{DSP}$ is set equal to 1 and $FLAG_{RPM}$ is set equal to 0, the engine RPM module regulates $RPM_{ENG}$ based on Input. If both $FLAG_{DSP}$ and $FLAG_{RPM}$ are set equal to 0, the engine RPM module regulates $RPM_{ENG}$ based on Input.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A differential score protection system that regulates an engine to inhibit damage to a differential driven by the engine, comprising:
   a first module that initiates a differential score protection mode; and
   a second module that decreases an engine speed when said engine speed exceeds an engine speed limit, wherein said engine speed limit is one of a plurality of predetermined values based on a design slip speed limit of said differential.

2. The differential score protection system of claim 1 wherein said engine speed limit is further determined based on a transmission gear ratio.

3. The differential score protection system of claim 1 wherein said decreasing includes decreasing at a fixed engine speed reduction rate.

4. The differential score protection system of claim 1 further comprising:
   sensors that monitor respective wheel speeds of first and second wheels; and
   a third module that determines a wheel slip differential based on said wheel speeds, wherein said initiating is executed when said wheel slip differential exceeds a threshold wheel slip differential.

5. The differential score protection system of claim 1 wherein said first and second wheels are driven by said differential.

6. The differential score protection system of claim 1 further comprising:
   a sensor that monitors a rotational speed of a transmission output shaft; and
   a third module that compares said rotational speed to an expected output shaft rotational speed, wherein said initiating is executed when said rotational speed exceeds said expected rotational speed by a threshold amount.

7. A method of operating an engine to inhibit damage to a differential driven by the engine, comprising:
   determining an engine speed limit based on a design slip speed limit of said differential;
   initiating a differential score protection mode; and
   decreasing an engine speed when said engine speed exceeds said engine speed limit.

8. The method of claim 7 wherein said engine speed limit is further determined based on a transmission gear ratio.

9. The method of claim 7 wherein said decreasing includes decreasing at a fixed engine speed reduction rate.

10. The method of claim 7 further comprising:
    monitoring respective wheel speeds of first and second wheels; and
    determining a wheel slip differential based on said wheel speeds, wherein said initiating is executed when said wheel slip differential exceeds a threshold wheel slip differential.

11. The method of claim 7 wherein said first and second wheels are driven by said differential.

12. The method of claim 7 further comprising:
    monitoring a rotational speed of a transmission output shaft; and
    comparing said rotational speed to an expected output shaft rotational speed, wherein said initiating is executed when said rotational speed exceeds said expected rotational speed by a threshold amount.

13. A method of operating an engine to inhibit damage to a differential driven by said engine, comprising:
    determining a plurality of engine speed limits based on respective gear ratios of a transmission that is driven by said engine and a design slip speed limit of said differential;
    initiating a differential score protection mode;
    selecting one of said plurality of engine speed limits; and
    decreasing an engine speed when said engine speed exceeds said selected engine speed limit.

14. The method of claim 13 wherein said selected engine speed limit is selected based on a current transmission gear ratio.

15. The method of claim 13 wherein said decreasing includes decreasing at a fixed engine speed reduction rate.

16. The method of claim 13 further comprising:
    monitoring respective wheel speeds of first and second wheels; and
    determining a wheel slip differential based on said wheel speeds, wherein said initiating is executed when said wheel slip differential exceeds a threshold wheel slip differential.

17. The method of claim 13 wherein said first and second wheels are driven by said differential.

18. The method of claim 13 further comprising;
    monitoring a rotational speed of a transmission output shaft; and
    comparing said rotational speed to an expected output shaft rotational speed, wherein said initiating is executed when said rotational speed exceeds said expected rotational speed by a threshold amount.

* * * * *